United States Patent
Shin (10) Patent No.: US 9,998,257 B2
(45) Date of Patent: Jun. 12, 2018

(54) RELAY METHOD AND RELAY SYSTEM FOR RELAYING TEMPORAL-SPATIAL BLOCK CODE SCHEME-BASED DATA USING MULTIPLE RELAY TERMINALS

(71) Applicant: SAMSUNG ELECTRONICS CO., LTD., Suwon-si, Gyeonggi-do (KR)

(72) Inventor: Won Jae Shin, Yongin-si (KR)

(73) Assignee: Samsung Electronics Co., Ltd. (KR)

(*) Notice: Subject to any disclaimer, the term of this patent is extended or adjusted under 35 U.S.C. 154(b) by 212 days.

(21) Appl. No.: 14/783,774

(22) PCT Filed: Dec. 17, 2013

(86) PCT No.: PCT/KR2013/011695
§ 371 (c)(1),
(2) Date: Oct. 9, 2015

(87) PCT Pub. No.: WO2014/168316
PCT Pub. Date: Oct. 16, 2014

(65) Prior Publication Data
US 2016/0301499 A1    Oct. 13, 2016

(30) Foreign Application Priority Data

Apr. 10, 2013   (KR) .................. 10-2013-0039259

(51) Int. Cl.
*H04L 1/06* (2006.01)
*H04B 7/026* (2017.01)
(Continued)

(52) U.S. Cl.
CPC ........... *H04L 1/0643* (2013.01); *H04B 7/026* (2013.01); *H04B 7/0452* (2013.01);
(Continued)

(58) Field of Classification Search
CPC .................................................. H04L 1/0643
See application file for complete search history.

(56) References Cited

U.S. PATENT DOCUMENTS

2006/0050655 A1* 3/2006 Shi ................ H04B 7/026
370/254
2006/0056338 A1* 3/2006 Abe ............... H04B 7/026
370/328

(Continued)

FOREIGN PATENT DOCUMENTS

JP    2012-134958    7/2012
JP    2012-520602    9/2012

(Continued)

OTHER PUBLICATIONS

International Search Report corresponding to International Patent Application No. PCT/KR2013/011695 dated Apr. 11, 2014.

*Primary Examiner* — Min Jung
*Assistant Examiner* — Toan Nguyen
(74) *Attorney, Agent, or Firm* — McAndrews, Held & Malloy, Ltd.

(57) ABSTRACT

Disclosed is a relay method for relaying temporal-spatial block code scheme-based data using a plurality of relay terminals. An embodiment comprises the steps of: generating an effective interference channel matrix on the basis of interference channel matrixes between source terminals and destination terminals; calculating a basis matrix indicating a null space of the effective interference channel matrix; generating an effective channel matrix on the basis of channel matrixes between the source terminals and the destination terminals; and generating beamforming matrixes for relay terminals on the basis of the effective channel matrix and the basis matrix.

18 Claims, 5 Drawing Sheets

(51) Int. Cl.
  H04B 7/0452 (2017.01)
  H04B 7/06 (2006.01)
  H04B 7/155 (2006.01)
  H04W 72/08 (2009.01)
  H04W 84/18 (2009.01)
  H04W 88/04 (2009.01)
  H04L 1/00 (2006.01)

(52) U.S. Cl.
  CPC ....... H04B 7/0617 (2013.01); H04B 7/15528 (2013.01); H04W 72/082 (2013.01); *H04L 1/0668* (2013.01); *H04L 2001/0097* (2013.01); *H04W 84/18* (2013.01); *H04W 88/04* (2013.01)

(56) References Cited

U.S. PATENT DOCUMENTS

| | | | |
|---|---|---|---|
| 2009/0175366 | A1 | 7/2009 | Maltsev et al. |
| 2009/0252079 | A1* | 10/2009 | Zhang .................... H04B 7/155 370/315 |
| 2011/0051837 | A1 | 3/2011 | Park et al. |
| 2011/0211547 | A1* | 9/2011 | Kim ....................... H04B 7/024 370/329 |
| 2012/0106405 | A1 | 5/2012 | Lioliou et al. |
| 2012/0114066 | A1 | 5/2012 | Choi et al. |
| 2013/0039265 | A1 | 2/2013 | Shin |
| 2013/0083735 | A1* | 4/2013 | Nogami ............... H04B 7/0639 370/328 |
| 2013/0258971 | A1* | 10/2013 | Lee ...................... H04W 72/082 370/329 |
| 2013/0279428 | A1* | 10/2013 | Liu ...................... H04B 7/0456 370/329 |

FOREIGN PATENT DOCUMENTS

| | | |
|---|---|---|
| KR | 1020070052511 | 5/2007 |
| KR | 1020080039711 | 5/2008 |
| KR | 1020080075803 | 8/2008 |
| KR | 1020100021378 | 2/2010 |
| KR | 1020100064191 | 6/2010 |
| KR | 1020100089166 | 8/2010 |
| KR | 1020100101280 | 9/2010 |
| KR | 1020100110965 | 10/2010 |
| KR | 1020110084818 | 7/2011 |
| KR | 1020120014792 | 2/2012 |
| KR | 1020120021966 | 3/2012 |
| KR | 1020120031700 | 4/2012 |
| KR | 1020120047337 | 5/2012 |
| KR | 1020120052654 | 5/2012 |
| KR | 1020120070141 | 6/2012 |
| WO | 20111131242 | 10/2011 |

* cited by examiner

RELAY METHOD AND RELAY SYSTEM FOR RELAYING TEMPORAL-SPATIAL BLOCK CODE SCHEME-BASED DATA USING MULTIPLE RELAY TERMINALS

CROSS-REFERENCE TO RELATED APPLICATIONS/INCORPORATION BY REFERENCE

This application is a 371 of International Patent Application No. PCT/KR2013/011695, filed Dec. 17, 2013, entitled "RELAY METHOD AND RELAY SYSTEM FOR RELAYING TEMPORAL-SPATIAL BLOCK CODE SCHEME-BASED DATA USING MULTIPLE RELAY TERMINALS", which claims priority to Korean Patent Application No. 10-2013-0039259, filed Apr. 10, 2013, entitled "RELAYING METHOD FOR RELAYING TIME-SPACE BLOCK CODE BASED DATA BY USING RELAY TERMINALS, AND RELAYING SYSTEM THEREOF". The above-identified applications are hereby incorporated herein by reference in their entirety.

BACKGROUND

Example embodiments relate to a relay method and a relay system to relay data using a plurality of relay terminals, and more particularly, to a method and a system to relay space-time block code (STBC) method-based data in a multiuser multi-hop multiple-input and multiple-output (MIMO) communication network.

In existing well-known multi-hop transmission methods, transferring and exchanging channel information may be important for effective multi-hop transmission.

In general, multi-hop transmission may be given significant consideration in an ad hoc network. However, in the ad hoc network, multi-hop cooperation among end terminals may not be readily performed as compared to a network including a controller, for example, a cellular network. Due to a channel information message exchange overhead and an inconsistency in channel information based on a change in a channel, transferring or exchanging channel information may be a challenging process.

The network including the controller may have a simpler structure for the multi-hop transmission as compared to the ad hoc network, because end terminals are synchronized with one another and resources are allocated in advance for exchanging channel information. However, as the number of users within a transmission range managed by the controller increases, an overhead for transferring and exchanging channel information may also increase.

SUMMARY

According to an example embodiment, there is provided a relay method to relay data among a plurality of terminal pairs using a plurality of relay terminals, the relay method including generating an effective interference channel matrix based on interference channel matrices between a plurality of source terminals and a plurality of destination terminals, calculating a basis matrix indicating a null space of the effective interference channel matrix, generating an effective channel matrix based on channel matrices between the source terminals and the destination terminals paired with the source terminals, and generating beamforming matrices for the relay terminals based on the effective channel matrix and the basis matrix.

When a first source terminal among the source terminals desires to transmit data to a first destination terminal among the destination terminals, the first source terminal and the first destination terminal may form a pair.

The source terminals may encode data using a predetermined space-time block code (STBC) method, and the destination terminals may decode the data using the STBC method.

The generating of the effective interference channel matrix may include obtaining a first channel matrix between a plurality of source antennas included in the source terminals and a plurality of relay antennas included in the relay terminals, and a second channel matrix between the relay antennas and a plurality of destination antennas included in the destination terminals, and calculating the effective interference channel matrix based on the first channel matrix and the second channel matrix.

The calculating of the effective interference channel matrix may include obtaining an interference pair of a source terminal and a destination terminal excluded from the terminal pairs, transposing a channel matrix between the source terminal belonging to the interference pair and any one of the relay terminals, and calculating a Kronecker product of the transposed channel matrix and a channel matrix between the destination terminal belonging to the interference pair and the any one of the relay terminals.

The effective interference channel matrix may include effective channels between antennas of the first source terminal and antennas of remaining destination terminals unpaired with the first source terminal.

The basis matrix may be included in the null space of the effective interference channel matrix, and include a plurality of null space vectors which are not zero vectors.

The generating of the effective channel matrix may include obtaining the first channel matrix between the source antennas included in the source terminals and the relay antennas included in the relay terminals, and the second channel matrix between the relay antennas and the destination antennas included in the destination terminals, and calculating the effective channel matrix based on the first channel matrix and the second channel matrix.

The calculating of the effective channel matrix may include transposing a channel matrix between a source terminal belonging to a terminal pair and any one of the relay terminals, and calculating a Kronecker product of the transposed channel matrix and a channel matrix between a destination terminal belonging to the terminal pair and the any one of the relay terminals.

The generating of the beamforming matrices may include calculating a matrix product of the effective channel matrix and the basis matrix, calculating an eigenvector corresponding to a maximum eigenvalue of a matrix from the calculated matrix product, calculating an inner product of the basis matrix and the eigenvector, and forming a matrix using vectors from the calculated inner product.

The generating of the beamforming matrices may include formulating a query of maximizing a throughput among the terminal pairs based on a transmission method used by the source terminals and the destination terminals, and calculating the beamforming matrices by solving the formulated query using the effective channel matrix and the basis matrix.

According to another example embodiment, there is provided a relay system configured to relay data between a plurality of source terminals and a plurality of destination terminals using a plurality of relay terminals, the relay system including an effective interference channel matrix generator configured to generate an effective interference channel matrix based on interference channel matrices between the source terminals and the destination terminals, a basis matrix calculator configured to calculate a basis matrix indicating a null space of the effective interference channel matrix, an effective channel matrix generator configured to generate an effective channel matrix based on channel matrices between the source terminals and the destination terminals paired with the source terminals, and a beamforming matrix generator configured to generate beamforming matrices for the relay terminals based on the effective channel matrix and the basis matrix. Here, the data may be generated based on an STBC method.

The relay system may further include a channel matrix obtainer configured to obtain a first channel matrix between a plurality of source antennas included in the source terminals and a plurality of relay antennas included in the relay terminals, and a second channel matrix between the relay antennas and a plurality of destination antennas included in the destination terminals.

The effective interference channel matrix generator may include an interference pair obtainer configured to obtain an interference pair of a source terminal and a destination terminal unpaired with the source terminal, a transposer configured to transpose a channel matrix between the source terminal belonging to the interference pair and any one of the relay terminals, and a Kronecker multiplier configured to calculate a Kronecker product of the transposed channel matrix and a channel matrix between the destination terminal belonging to the interference pair and the any one of the relay terminals.

The effective channel matrix generator may include a terminal pair obtainer configured to obtain a terminal pair of a source terminal and a destination terminal paired with the source terminal, a transposer configured to transpose a channel matrix between the source terminal belonging to the terminal pair and any one of the relay terminals, and a Kronecker multiplier configured to calculate a Kronecker product of the transposed channel matrix and a channel matrix between the destination terminal belonging to the terminal pair and the any one of the relay terminals.

The beamforming matrix generator may include a matrix multiplier configured to calculate a matrix product of the effective channel matrix and the basis matrix, an eigenvector calculator configured to calculate an eigenvector corresponding to a maximum eigenvalue of a matrix from the calculated matrix product, an inner multiplier configured to calculate an inner product of the basis matrix and the eigenvector, and a matrix former configured to form a matrix using vectors from the calculated inner product.

The beamforming matrix generator may include a formulator configured to formulate a query of maximizing a throughput among terminal pairs based on a transmission method used by the source terminals and the destination terminals, and a solver configured to solve the formulated query using the effective channel matrix and the basis matrix to calculate the beamforming matrices.

DETAIL DESCRIPTION

Figure 1:
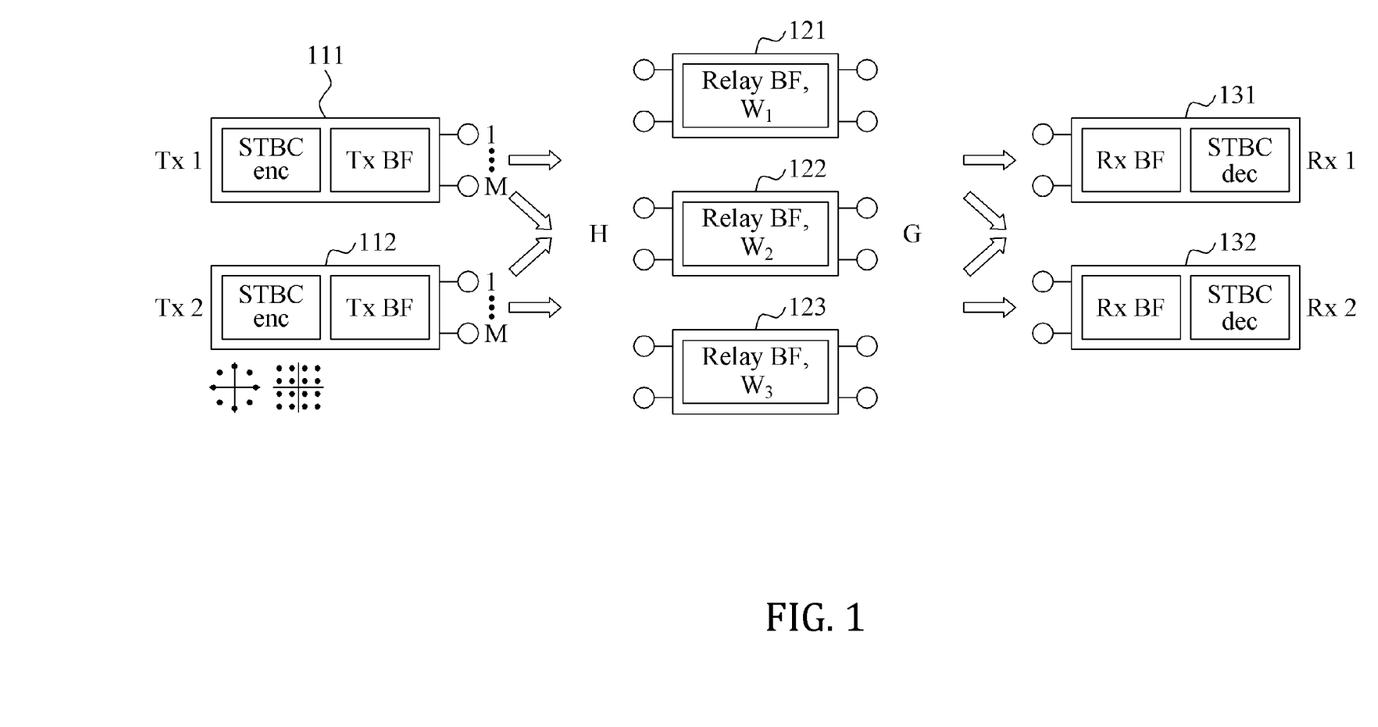
FIG. 1 illustrates a multiuser multi-hop interference network according to an embodiment.

A multiuser multi-hop interference network according to an embodiment:

FIG. 1 illustrates a multiuser multi-hop interference network according to an embodiment.

Referring to FIG. 1, an interference network includes a plurality of source terminals, for example, a first source terminal 111 and a second source terminal 112, a plurality of relay terminals, for example, a first relay terminal 121, a second relay terminal 122, and a third relay terminal 123, and a plurality of destination terminals, for example, a first destination terminal 131 and a second destination terminal 132. For example, the network may include K source terminals, L relay terminals, and K destination terminals.

For ease of description, it is assumed that K is 2 and L is 3. The first source terminal 111 and the second source terminal 112 may include concurrent transmission modes using a same frequency, and the first relay terminal 121, the second relay terminal 122, and the third relay terminal 123 may include cooperative relay nodes that operate through half-duplex.

Each of the first source terminal 111 and the second source terminal 112, and the first destination terminal 131 and the second destination terminal 132 may include at least two antennas, and each of the first relay terminal 121, the second relay terminal 122, and the third relay terminal 123 may include at least one antenna. For example, the first source terminal 111, and the second source terminal 112, and the first destination terminal 131 and the second destination terminal 132 may include M antennas in total, and an i-th relay terminal may include $N_i$ antennas.

The first source terminal 111 and the second source terminal 112, and the first destination terminal 131 and the second destination terminal 132 may form terminal pairs. For example, in a case that the first source terminal 111 is configured to transmit data to the first destination terminal 131, the first source terminal 111 and the first destination terminal 131 may form a terminal pair.

Here, it is assumed that the first source terminal 111 is configured to transmit data to the first destination terminal 131, and the second source terminal 112 is configured to transmit data to the second destination terminal 132. Under such an assumption, the first source terminal 111 and the first destination terminal 131 form a pair, and the second source terminal 112 and the second destination terminal 132 form a pair.

The first source terminal 111 may transmit data to the first destination terminal 131 through the first relay terminal 121, the second relay terminal 122, and the third relay terminal 123. Similarly, the second source terminal 112 may transmit data to the second destination terminal 132 through the first relay terminal 121, the second relay terminal 122, and the third relay terminal 123.

A channel between a plurality of antennas included in each of the source terminals and the at least one antenna included in each of the relay terminals, which is a first-hop channel, may be expressed as a first channel matrix H. For example, referring to EQN. (1), the first channel matrix H may be a matrix of a magnitude of $\sum_{j=1}^{L} N_j \times MK$:

$$\begin{bmatrix} H_{1,1} & H_{1,2} & \cdots & H_{1,K} \\ H_{2,1} & H_{2,2} & \cdots & H_{2,K} \\ \vdots & \vdots & \ddots & \vdots \\ H_{L,1} & H_{L,2} & \cdots & H_{L,K} \end{bmatrix} \quad \text{EQN. (1)}$$

A received signal vector to be received by the i-th relay terminal through the first-hop channel is expressed as in EQN. (2).

$$y_l^{[R]} = \sum_{i=1}^{K} H_{l,i} x_i^{[S]} + z_l \quad \text{EQN. (2)}$$

In EQN. (2), $y_l^{[R]}$, $l \in \{1, 2, \ldots, L\}$, denotes a channel output vector of a magnitude of $N_l \times 1$, $H_{l,i}$ denotes a channel matrix of a magnitude of $N_l \times M$ from an i-th source terminal to the first relay terminal, and $z_l$ denotes a noise vector to be received by the first relay terminal.

The i-th relay terminal may generate a new transmission signal $x_l^{[R]}$ based on the received $y_l^{[R]}$. The new transmission signal $x_l^{[R]}$ generated by the i-th relay terminal may be expressed as in EQN. (3).

$$x_l^{[R]} = W_l y_l^{[R]} \quad \text{EQN. (3)}$$

In EQN. (3), $W_l$ denotes a relay beamforming matrix of a magnitude of $N_l \times N_l$ for the first relay terminal 121.

A channel between the at least one antenna included in each of the relay terminals and a plurality of antennas included in each of the destination terminals, which is a second-hop channel, may be expressed as a second channel matrix G. For example, referring to EQN. (4), the second channel matrix G may be a matrix of a magnitude of $MK \times \sum_{j=1}^{L} N_j$.

$$\begin{bmatrix} G_{1,1} & G_{1,2} & \cdots & G_{1,L} \\ G_{2,1} & G_{2,2} & \cdots & G_{2,L} \\ \vdots & \vdots & \ddots & \vdots \\ G_{K,1} & G_{K,2} & \cdots & G_{K,L} \end{bmatrix} \quad \text{EQN. (4)}$$

A received signal vector to be received by a j-th destination terminal through the second-hop channel may be expressed as in EQN. (5).

$$y_j^{[D]} = \sum_{l=1}^{L} G_{j,l} x_l^{[R]} + n_j \quad \text{EQN. (5)}$$

In EQN. (5), $G_{j,l}$ denotes a channel matrix of a magnitude of $M \times N_1$ from the first relay terminal 121 to the j-th destination terminal, and $n_j$ denotes a noise vector to be received by the j-th destination terminal.

Hereinafter, an operation of each of the source terminals, the relay terminals, and the destination terminals in the network will be described in more detail.

A Transmission Scheme of Source Terminals According to an Embodiment

According to an embodiment, a source terminal may apply an Alamouti code method, as in transmission of data in a point-to-point (2×2) multiple-input and multiple-output (MIMO) channel.

The Alamouti code method refers to a space-time block code (STBC) method that may be used when the number of source antennas included in a source terminal is 2 and may achieve a full diversity and a full rate.

Referring to EQN. (6), a source terminal may transmit two symbols through two time slots using two source antennas.

$$X = \begin{bmatrix} S_1 & S_2 \\ -S_2^* & S_1^* \end{bmatrix} \quad \text{EQN. (6)}$$

When the source terminal successfully transmits all the symbols, the source terminal may transmit, to a corresponding network, two symbols per unit time. Here, to successfully transmit the symbols using the Alamouti code method, all channels are assumed to be fixed during the two time slots.

In an example, an STBC-based interference neutralization algorithm may perform beamforming using a plurality of relay terminals. In another example, the STBC-based interference neutralization algorithm may perform the beamforming using a plurality of source terminals and a plurality of destination terminals in addition to the relay terminals to improve performance of a network.

A Relay Scheme of Relay Terminals According to an Embodiment (1) Step 1: Interference Neutralization According to an embodiment, a relay terminal may prevent a destination terminal from being affected by interference of a signal transmitted from remaining source terminals excluding a source terminal (e.g., a first source terminal) belonging to a terminal pair formed with the destination terminal (e.g., a first destination terminal), by using a relay beamforming matrix for which both a first-hop channel and a second-hop channel are simultaneously considered. Here, the relay terminal may perform linear beamforming.

A received signal to be received by destination terminals may be expressed as in EQN. (7).

$$\begin{bmatrix} y_1(k) \\ y_2(k) \end{bmatrix} = \begin{bmatrix} G_{1,1}(k) & G_{1,2}(k) & G_{1,3}(k) \\ G_{2,1}(k) & G_{2,2}(k) & G_{2,3}(k) \end{bmatrix} \quad \text{EQN. (7)}$$

$$\begin{bmatrix} W_1(k) & 0 & 0 \\ 0 & W_2(k) & 0 \\ 0 & 0 & W_3(k) \end{bmatrix} \begin{bmatrix} H_{1,1}(k) & H_{1,2}(k) \\ H_{2,1}(k) & H_{2,2}(k) \\ H_{3,1}(k) & H_{3,2}(k) \end{bmatrix}$$

$$\begin{bmatrix} x_1(k) \\ x_2(k) \end{bmatrix} + \begin{bmatrix} \tilde{n}_1(k) \\ \tilde{n}_2(k) \end{bmatrix}$$

$$= \begin{bmatrix} \Lambda_1(k) & 0 \\ 0 & \Lambda_2(k) \end{bmatrix} \begin{bmatrix} x_1(k) \\ x_2(k) \end{bmatrix} + \begin{bmatrix} \tilde{n}_1(k) \\ \tilde{n}_2(k) \end{bmatrix}$$

In EQN. (7), $x_i(k)$ denotes a symbol to be transmitted by an i-th source terminal in a k-th time slot. $H_{ij}(k)$ denotes an MIMO channel from a j-th source terminal to an i-th relay terminal in the k-th time slot, and $G_{ij}(k)$ denotes an MIMO channel from a j-th relay terminal to an i-th destination terminal in the k-th time slot. $W_i(k)$ denotes a beamforming matrix of the i-th relay terminal.

On the right hand side of EQN. (7), elements of an off-diagonal block matrix of $$\begin{bmatrix} \Lambda_1(k) & 0 \\ 0 & \Lambda_2(k) \end{bmatrix}$$

being 0 indicate that interference by other source terminals unpaired with a certain destination node may be eliminated.

Here, all values besides $W_i(k)$ may be given environment values. For example, a relay terminal may be previously aware of values besides $W_i(k)$ by receiving feedback from a base station and the like.

The relay terminal may allow all effective channels to be a block diagonal matrix using $W_i(k)$. In such a case, the relay method according to an embodiment may enable interference-free communications among users.

As described in the foregoing, it is assumed that a channel does not change during the two time slots. Thus, it is assumed that the relay beamforming matrix may not change during the two-time slots, for example, the k-th time slot and a k+l-th time slot.

Thus, a time index k included in a channel matrix may be eliminated. In such a case, a condition for completely neutralizing interference among users may be expressed as in EQN. (8).

$$G_{1,1}W_1H_{1,2}+G_{1,2}W_2H_{2,2}+G_{1,3}W_3H_{3,2}=0_{M\times M}$$

$$G_{2,1}W_1H_{1,1}+G_{2,2}W_2H_{2,1}+G_{2,3}W_3H_{3,1}=0_{M\times M} \quad \text{EQN. (8)}$$

EQN. (9) is an equation expressing a relationship between a Kronecker product $\otimes$ and a property of a related column vector stacking operation.

$$\text{vec}(A\times B)=(B^T \otimes A)\text{vec}(X) \quad \text{EQN. (9)}$$

In EQN. (9), vec(X) is an operation for vectorizing a matrix X. For example, when the matrix X has a magnitude of m×n, the magnitude of vec(X) may be mn×1.

Here, EQN. (8) may be changed as in EQN. (10) based on EQN. (9).

$$(H_{1,2}^T \otimes G_{1,1})\text{vec}(W_1)+(H_{2,2}^T \otimes G_{1,2})\text{vec}(W_2)+(H_{3,2}^T \otimes G_{1,3})\text{vec}(W_3)=0_{M^2\times 1}$$

$$(H_{1,1}^T \otimes G_{2,1})\text{vec}(W_1)+(H_{2,1}^T \otimes G_{2,2})\text{vec}(W_2)+(H_{3,1}^T \otimes G_{2,3})\text{vec}(W_3)=0_{M^2\times 1} \quad \text{EQN. (10)}$$

In EQN. (10), vec($W_k$) denotes a vector representation value generated by performing the column vector staking operation on the relay beamforming matrix $W_k$.

A plurality of linear equations included in Equation 10 may be expressed in a matrix form of EQN. (11).

$$\underbrace{\begin{bmatrix} H_{1,2}^T \otimes G_{1,1} & H_{2,2}^T \otimes G_{1,2} & H_{3,2}^T \otimes G_{1,3} \\ H_{1,1}^T \otimes G_{2,1} & H_{2,1}^T \otimes G_{2,2} & H_{3,1}^T \otimes G_{2,3} \end{bmatrix}}_{8\times 12} \begin{bmatrix} \text{vec}(W_1) \\ \text{vec}(W_2) \\ \text{vec}(W_3) \end{bmatrix} = \quad \text{EQN. (11)}$$

$$0_{2M^2\times 1} \Rightarrow T\bar{w} = 0_{2M^2\times 1}$$

A solution satisfying EQN. (11) may be expressed as in EQN. (12). Since a magnitude of a matrix T is 8×12, $\bar{w}$ may permanently exist.

The relay method according to an embodiment may generate the matrix T, which is an effective interference channel matrix, using EQN. (11).

$$\bar{w}=\text{null}(T) \quad \text{EQN. (12)}$$

In EQN. (12), null(A) denotes a null space of a matrix A. The null space of the matrix A may be a set of all vectors y that satisfy Ay=0. Thus, the relay method according to an embodiment may obtain beamforming matrices for the relay terminals by forming a matrix using vec($W_i$) vectors included in $\bar{w}$ calculated using EQN. (12).

(2) Step 2: Throughput Improvement

According to a theory of linear algebra, $\bar{w}$ V does not have a sole solution in EQN. (12). $\bar{w}$ may be a vector included in a four-dimensional (4D) space, which is a dimension of the null space of the matrix T. In general, such a dimension of the null space may increase when the number of relay terminals or antennas included in the relay terminals increases.

The relay method according to an embodiment may improve throughput performance of a network by applying the characteristics described in the foregoing.

In more detail, any vector included in the 4D space may be possible for $\bar{w}$, and thus $\bar{w}$ may be set as in EQN. (13).

$$\bar{w} = \begin{bmatrix} \text{vec}(W_1) \\ \text{vec}(W_2) \\ \text{vec}(W_3) \end{bmatrix} = N_w w \quad \text{EQN. (13)}$$

In EQN. (13), $N_w$ denotes a 4D basis matrix indicating the null space, and w denotes a coefficient vector for linearly combining null space vectors included in such a basis matrix.

The basis matrix may be set based on the number of source terminals, relay terminals, destination terminals, and antennas included in each terminal, and the like.

The null space vectors included in the basis matrix may still exist in the null space despite various linear combinations of the null space vectors. Thus, $\bar{w}$ according to EQN. (13) may become a solution satisfying an interference neutralization condition equation according to EQN. (12).

The relay method according to an embodiment may generate a beamforming matrix for a relay terminal based on EQN. (13). In such a case, all interference affecting an i-th destination terminal, wherein k is not i (k≠i), from a k-th source terminal through a plurality of relay terminals may be eliminated.

Here, a magnitude of a direct channel from the k-th source terminal to a k-th destination terminal may be expressed as in EQN. (14).

$$G_{1,1}W_1H_{1,1}+G_{1,2}W_2H_{2,1}+G_{1,3}W_3H_{3,1}=\Lambda_1$$

$$G_{2,1}W_1H_{1,2}+G_{2,2}W_2H_{2,2}+G_{2,3}W_3H_{3,2}=\Lambda_2 \quad \text{EQN. (14)}$$

Using a characteristic of EQN. (9), the direct channel of EQN. (14) may be expressed as a matrix equation as in EQN. (15).

$$\underbrace{\begin{bmatrix} H_{1,1}^T \otimes G_{1,1} & H_{2,1}^T \otimes G_{1,2} & H_{3,1}^T \otimes G_{1,3} \\ H_{1,1}^T \otimes G_{2,1} & H_{2,1}^T \otimes G_{2,2} & H_{3,1}^T \otimes G_{2,3} \end{bmatrix}}_{F:8\times 12} \underbrace{\begin{bmatrix} \text{vec}(W_1) \\ \text{vec}(W_2) \\ \text{vec}(W_3) \end{bmatrix}}_{N_w w} = \quad \text{EQN. (15)}$$

$$\begin{bmatrix} \text{vec}(\Lambda_1) \\ \text{vec}(\Lambda_2) \end{bmatrix}$$

The relay method according to an embodiment may generate a matrix F, which is an effective channel matrix, using EQN. (15).

When a plurality of source terminals and a plurality of destination terminals use the Alamouti code method, the relay method according to an embodiment may formulate a query of maximizing a throughput among a plurality of terminal pairs.

For example, referring to EQN. (16), the relay method may formulate a query of maximizing a sum rate performance.

$$\max_{w} \sum_{i=1}^{2} R_i = \max_{w} \sum_{i} \log_2(1 + \|\Lambda_i\|_F^2 SNR) \quad \text{EQN. (16)}$$

$$\approx \max_{N_w w} \sum_{i} \|\Lambda_i\|_F^2 \cdot SNR = \max_{N_w w} \sum_{i} \|\Lambda_i\|_F^2$$

In EQN. (16), an approximation of a second equation is a result of utilizing a relationship of $\log_2(1+x) \approx x$ when x is sufficiently small. In addition, $\|\cdot\|_F^2$ is a Frobenius norm and may be defined as a sum of squares of magnitudes of all elements in a matrix as in EQN. (17).

Let $$A = \begin{bmatrix} a_{11} & a_{12} \\ a_{21} & a_{22} \end{bmatrix}, \quad \text{EQN. (17)}$$

$$\|A \cdot\|_F^2 = |a_{11}|^2 + |a_{12}|^2 + |a_{21}|^2 + |a_{22}|^2,$$

$\overline{w}$ satisfying EQN. (16) may be calculated using EQN. (18).

$$\max_{N_w w} \sum_{i} \|\Lambda_i\|_F^2 = \max_{N_w w} \begin{bmatrix} vec(\Lambda_1) \\ vec(\Lambda_2) \end{bmatrix}^H \times \begin{bmatrix} vec(\Lambda_1) \\ vec(\Lambda_2) \end{bmatrix} \quad \text{EQN. (18)}$$

$$= \max_{N_w w} (w^H N_w^H F^H)(F N_w w)$$

$$= \max_{N_w w} w^H (N_w^H F^H F N_w) w$$

Thus, the relay method may calculate w using EQN. (19).

$$w = \text{maxeigvec}(FN_w) \quad \text{EQN. (19)}$$

In EQN. (19), eigvec(A) denotes an eigenvector corresponding to a maximum eigenvalue of a matrix A.

Further, the relay method may calculate $\overline{w}$ using EQN. (20).

$$\overline{w} = \begin{bmatrix} vec(W_1) \\ vec(W_2) \\ vec(W_3) \end{bmatrix} = N_w w \quad \text{EQN. (20)}$$

The relay method may calculate beamforming matrices W, for the relay terminals by forming a matrix using w.

Figure 4:
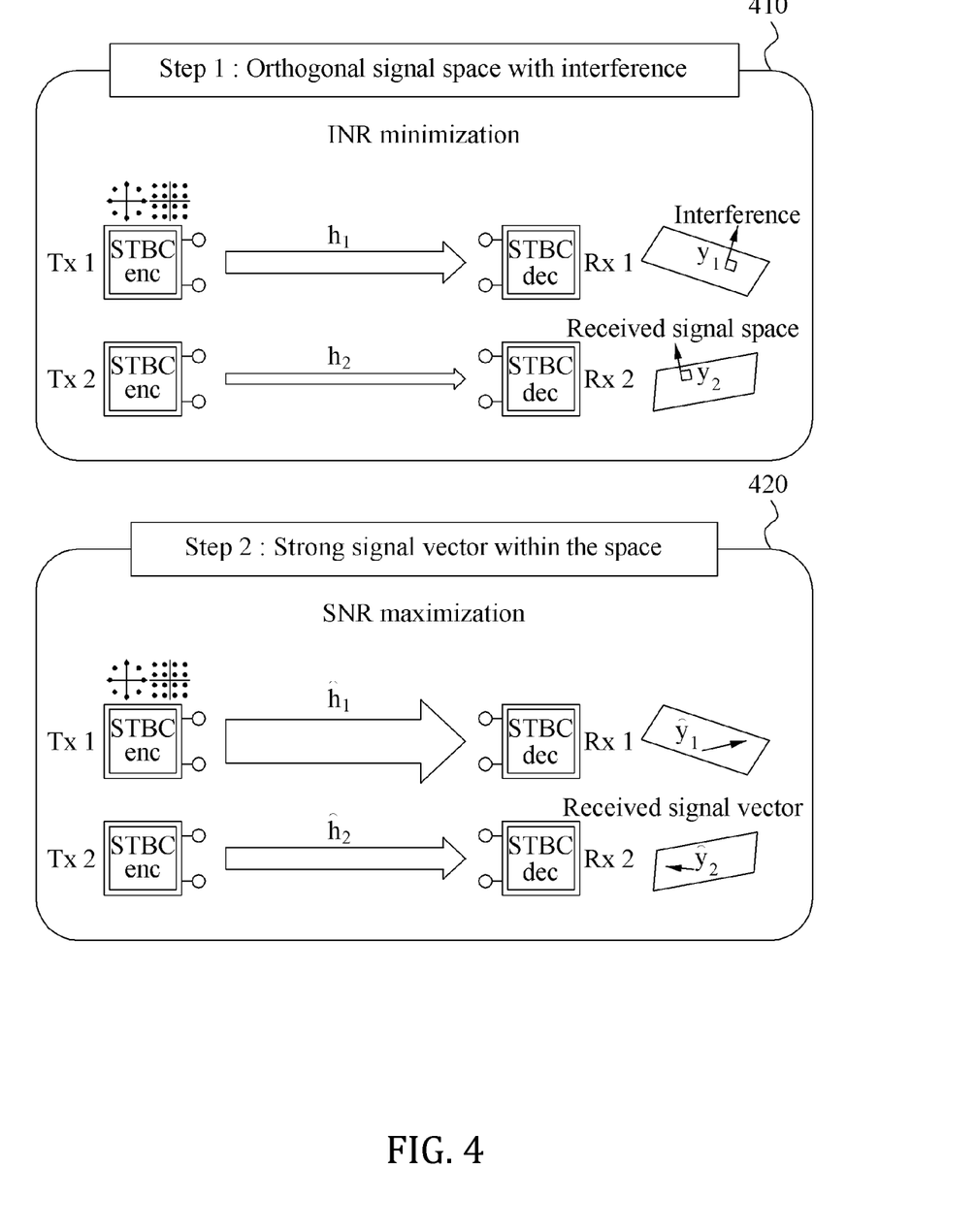
FIG. 4 illustrates an effect based on a relay beamforming matrix selecting method according to an embodiment.

FIG. 4 illustrates an effect based on a relay beamforming matrix selecting method according to an embodiment.

Referring to FIG. 4, a relay method of relay terminals may be summarized in two steps to be described hereinafter.

In step 1, block 410, the relay method of the relay terminals may calculate a signal space orthogonal to interference, which is illustrated as an orthogonal signal space with interference, and minimize or eliminate interference by other terminals that do not belong to terminal pairs.

The relay method of the relay terminals may determine a range, for example, a basis matrix, that is selectable as a relay beamforming matrix that may completely eliminate interference through interference neutralization at the relay terminals.

In step 2, block 420, the relay method of the relay terminals may calculate a strong signal vector within the signal space orthogonal to interference and maximize a signal-to-noise ratio (SNR).

The relay method of the relay terminals may determine the relay beamforming matrix by linearly combining basis vectors included in the basis matrix based on a transmission method used by a source terminal and a destination terminal.

Thus, the relay method may eliminate interference among users and simultaneously maximize a throughput of a network, for example, a diversity gain.

That is, the relay method may improve the diversity gain in addition to a degree of freedom (DoF) by applying the STBC method and the interference neutralization method simultaneously.

A Receiving Method of Destination Terminals According to an Embodiment

When using the relay beamforming matrix $W_i$ described in the foregoing, respective effective channels of two terminal pairs may be expressed as in EQN. (21).

$$G_{1,1}W_1H_{1,1} + G_{1,2}W_2H_{2,1} + G_{1,3}W_3H_{3,1} = \Lambda_1$$

$$G_{2,1}W_1H_{1,2} + G_{2,2}W_2H_{2,2} + G_{2,3}W_3H_{3,2} = \Lambda_2 \quad \text{EQN. (21)}$$

Such a channel as expressed in EQN. (21) may not change in two time slots using the Alamouti code method.

Thus, referring to EQN. (22), a destination terminal may decode symbols received during the two time slots, similarly to performing Alamouti decoding in a single-hop (2×2) MIMO channel.

$$\hat{y}_i = \begin{bmatrix} y_i^1(k) & y_i^1(k+T) \\ y_i^2(k) & y_i^2(k+T) \end{bmatrix} = \begin{bmatrix} \Lambda_i^{(1,1)} & \Lambda_i^{(1,2)} \\ \Lambda_i^{(2,1)} & \Lambda_i^{(2,2)} \end{bmatrix} \begin{bmatrix} s_1 & s_2 \\ -s_2^* & s_1^* \end{bmatrix} + \quad \text{EQN. (22)}$$

$$\begin{bmatrix} n_i^1(k) & n_i^1(k+T) \\ n_i^2(k) & yn_i^2(k+T) \end{bmatrix}, i, j \in \{1, 2\}$$

$$f_1(\hat{y}_1) = (|\Lambda_i^{(1,1)}|^2 + |\Lambda_i^{(1,2)}|^2 + |\Lambda_i^{(2,1)}|^2 + |\Lambda_i^{(2,2)}|^2)s_1 + \tilde{n}_i^1 =$$

$$\|\Lambda_1\|_F^2 s_1 + \tilde{n}_i^1$$

$$f_2(\hat{y}_2) = (|\Lambda_i^{(1,1)}|^2 + |\Lambda_i^{(1,2)}|^2 + |\Lambda_i^{(2,1)}|^2 + |\Lambda_i^{(2,2)}|^2)s_2 + \tilde{n}_i^2 =$$

$$\|\Lambda_2\|_F^2 s_2 + \tilde{n}_i^1$$

As shown in EQN. (22), a full diversity order, for example, 4, may be achieved using the Alamouti code method. Thus, the relay method according to an embodiment may achieve an array gain in a low SNR region or an intermediate SNR region, and improve a sum rate.

Example Embodiments

Hereinafter, example embodiments will be described in detail with reference to the accompanying drawings.

Figure 2:
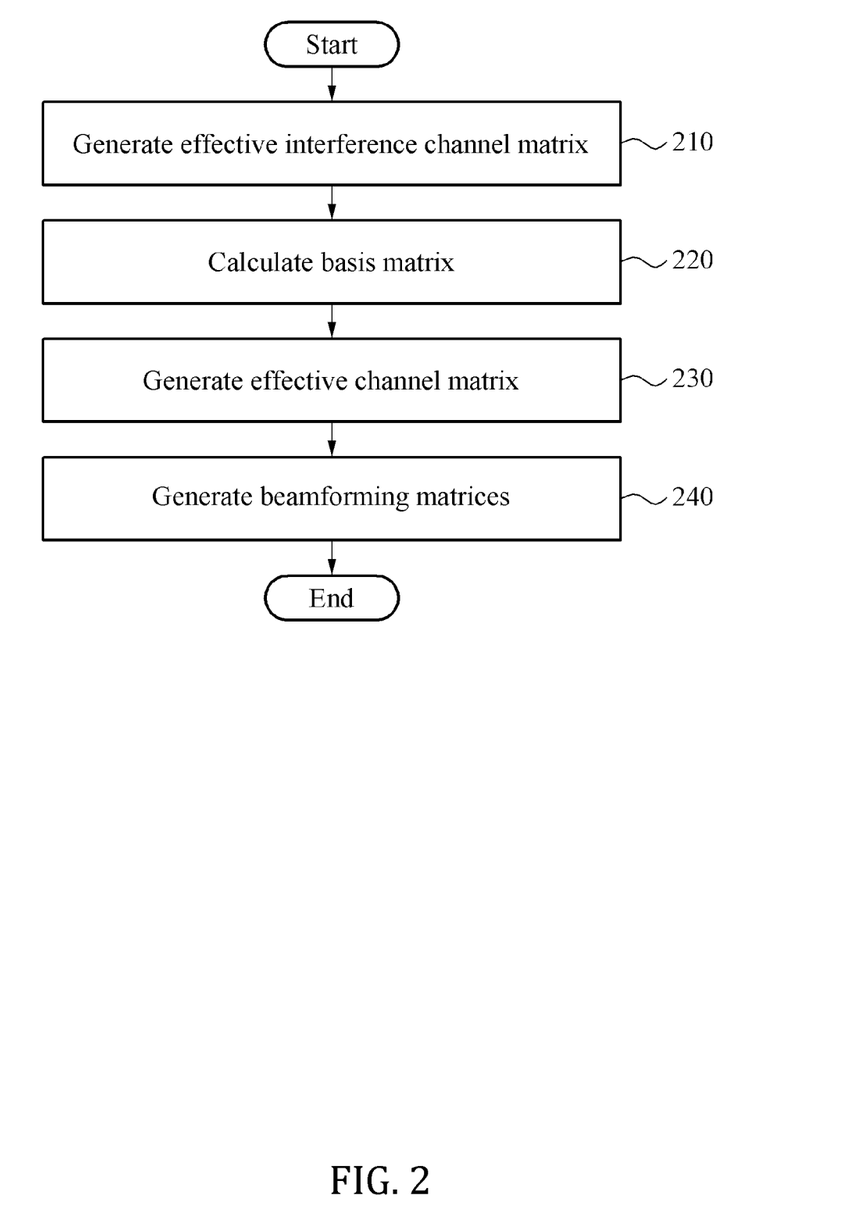
FIG. 2 is a flowchart illustrating a relay method of relaying data among a plurality of terminal pairs using a plurality of relay terminals according to an embodiment.

FIG. 2 is a flowchart illustrating a relay method of relaying data among a plurality of terminal pairs using a plurality of relay terminals according to an embodiment.

Referring to FIG. 2, in operation 210, the relay method generates an effective interference channel matrix based on interference channel matrices between a plurality of source terminals (e.g., the first source terminal 111 and the second source terminal 112 of FIG. 1) and a plurality of destination terminals (e.g., the first destination terminal 131 and the second destination terminal 132 of FIG. 1).

The effective interference channel matrix may include effective channels between antennas of a first source terminal (e.g., the first source terminal 111 of FIG. 1) and antennas of remaining destination terminals unpaired with the first source terminal.

In more detail, in operation 210, the relay method obtains a first channel matrix between a plurality of source antennas included in the source terminals (e.g., the first source terminal 111 and the second source terminal 112 of FIG. 1) and a plurality of relay antennas included in the relay terminals (e.g., the first relay terminal 121, the second relay terminal 122, and the third relay terminal 123 of FIG. 1), and a second channel matrix between the relay antennas and a plurality of destination antennas included in the destination terminals (e.g., the first destination terminal 131 and the second destination terminal 132 of FIG. 1), and calculates the effective interference channel matrix based on the first channel matrix and the second channel matrix.

The relay method obtains an interference pair of a source terminal (e.g., the first source terminal 111 of FIG. 1) and a destination terminal (e.g., the first destination terminal 131 of FIG. 1) which are not included in of the terminal pairs, transposes a channel matrix between the source terminal belonging to the interference pair and one of the relay terminals (e.g., the first relay terminal 121 of FIG. 1), and calculates a Kronecker product of the transposed channel matrix and a channel matrix between the destination terminal belonging to the interference pair and the any one of the relay terminals to calculate the effective interference channel matrix.

In operation 220, the relay method calculates a basis matrix indicating a null space of the effective interference channel matrix.

The basis matrix may be included in the null space of the effective interference channel matrix, and include a plurality of null space vectors which are not zero vectors.

In operation 230, the relay method generates an effective channel matrix based on channel matrices between the source terminals and the destination terminals paired with the source terminals.

In more detail, in operation 230, the relay method obtains the first channel matrix between the source antennas included in the source terminals and the relay antennas included in the relay terminals and the second channel matrix between the relay antennas and the destination antennas included in the destination terminals, and calculates the effective channel matrix based on the first channel matrix and the second channel matrix.

The relay method transposes a channel matrix between a source terminal belonging to a terminal pair and any one of the relay terminals, and calculates a Kronecker product of the transposed channel matrix and a channel matrix between a destination terminal belonging to the terminal pair and the any one of the relay terminals to calculate the effective channel matrix.

In operation 240, the relay method generates beamforming matrices for the relay terminals based on the effective channel matrix and the basis matrix.

In more detail, in operation 240, the relay method formulates a query of maximizing a throughput among the terminal pairs based on a transmission method used by the source terminals (e.g., the first source terminal 111 and the second source terminal 112 of FIG. 1) and the destination terminals (e.g., the first destination terminal 131 and the second destination terminal 132 of FIG. 1), and solves the formulated query using the effective channel matrix and the basis matrix to calculate the beamforming matrices.

For example, when the source terminals and the destination terminals use an Alamouti code method, the relay method may formulate a query of maximizing a sum rate performance.

Here, to seek a solution for the formulated query, the relay method may calculate a matrix product of the effective channel matrix and the basis matrix, calculate an eigenvector corresponding to a maximum eigenvalue of a matrix from the calculated matrix product, calculate an inner product of the basis matrix and the eigenvector, and form a matrix using vectors from the calculated inner product.

The method according to example embodiments may be stored in a non-transitory computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of the non-transitory computer-readable media include magnetic media such as hard disks, floppy disks, and magnetic tape; optical media such as CD read-only memory (ROM) discs; magneto-optical media such as floptical disks; and hardware devices that are specially configured to store and perform program instructions, such as ROM devices and random access memory (RAM). Examples of the program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

The description provided with reference to FIG. 1 may be applicable to the description of each operation illustrated with reference to FIG. 2, and thus a more detailed description will be omitted here.

Figure 3:
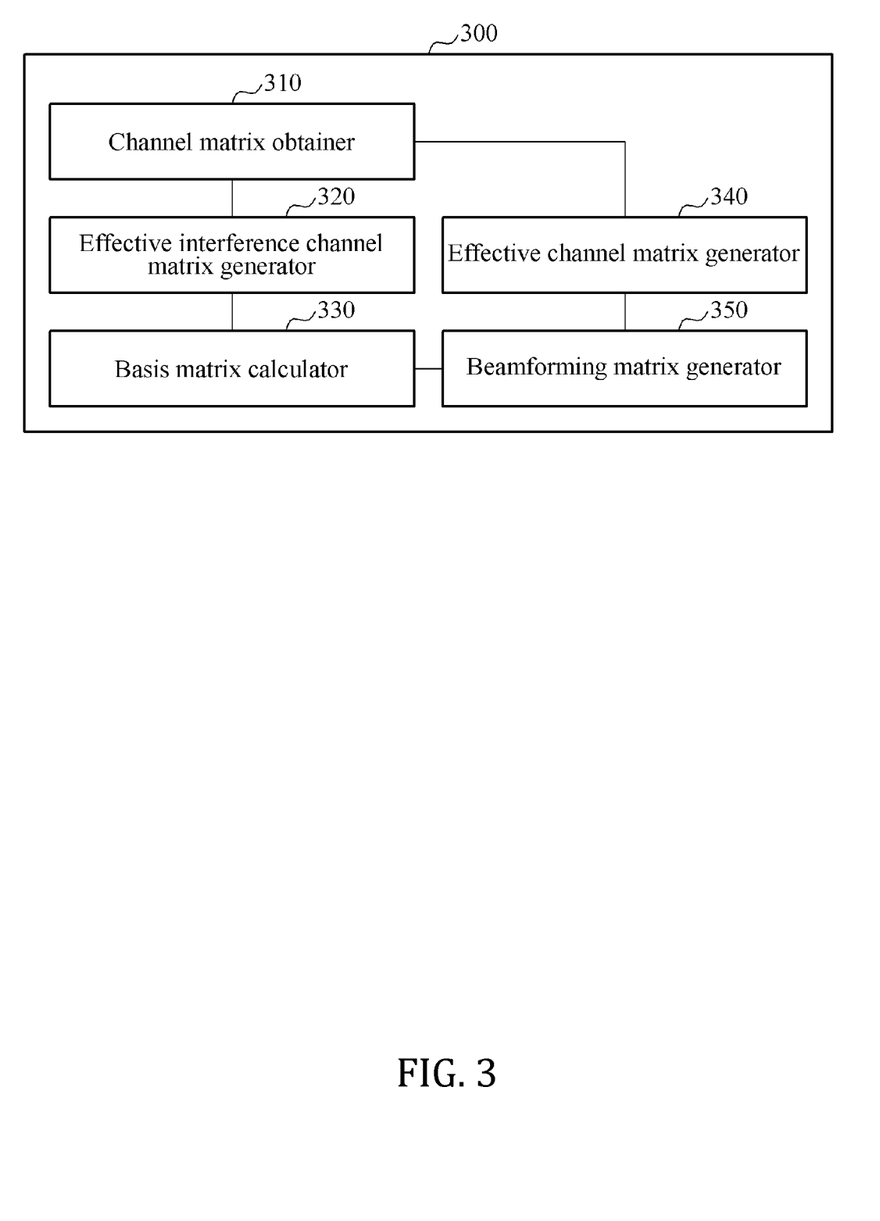
FIG. 3 is a block diagram of a relay system configured to relay data between a plurality of source terminals and a plurality of destination terminals using a plurality of relay terminals according to an embodiment.

FIG. 3 is a block diagram of a relay system configured to relay data between a plurality of source terminals (e.g., the first source terminal 111 and the second source terminal 112 of FIG. 1) and a plurality of destination terminals (e.g., the first destination terminal 131 and the second destination terminal 132 of FIG. 1) using a plurality of relay terminals (e.g., the first relay terminal 121, the second relay terminal 122, and the third relay terminal 123 of FIG. 1) according to an embodiment.

Referring to FIG. 3, the relay system includes a channel matrix obtainer 310, an effective interference channel matrix generator 320, a basis matrix calculator 330, an effective channel matrix generator 340, and a beamforming matrix generator 350.

The channel matrix obtainer 310 obtains a first channel matrix between a plurality of source antennas included in the source terminals (e.g., the first source terminal 111 and the second source terminal 112 of FIG. 1), and a plurality of relay antennas included in the relay terminals (e.g., the first relay terminal 121, the second relay terminal 122, and the third relay terminal 123 of FIG. 1), and a second channel matrix between the relay antennas and a plurality of destination antennas included in the destination terminals (e.g., the first destination terminal 131 and the second destination terminal 132 of FIG. 1).

The effective interference channel matrix generator 320 generates an effective interference channel matrix based on interference channel matrices between the source terminals and the destination terminals.

The basis matrix calculator 330 calculates a basis matrix indicating a null space of the effective interference channel matrix.

The effective channel matrix generator 340 generates an effective channel matrix based on channel matrices between the source terminals and the destination terminals paired with the source terminals.

The beamforming matrix generator 350 generates beamforming matrices for the relay terminals based on the effective channel matrix and the basis matrix.

The descriptions provided with reference to FIGS. 1 and 2 may be applicable to the description of each module illustrated with reference to FIG. 3, and thus a more detailed description will be omitted here.

Figure 5:
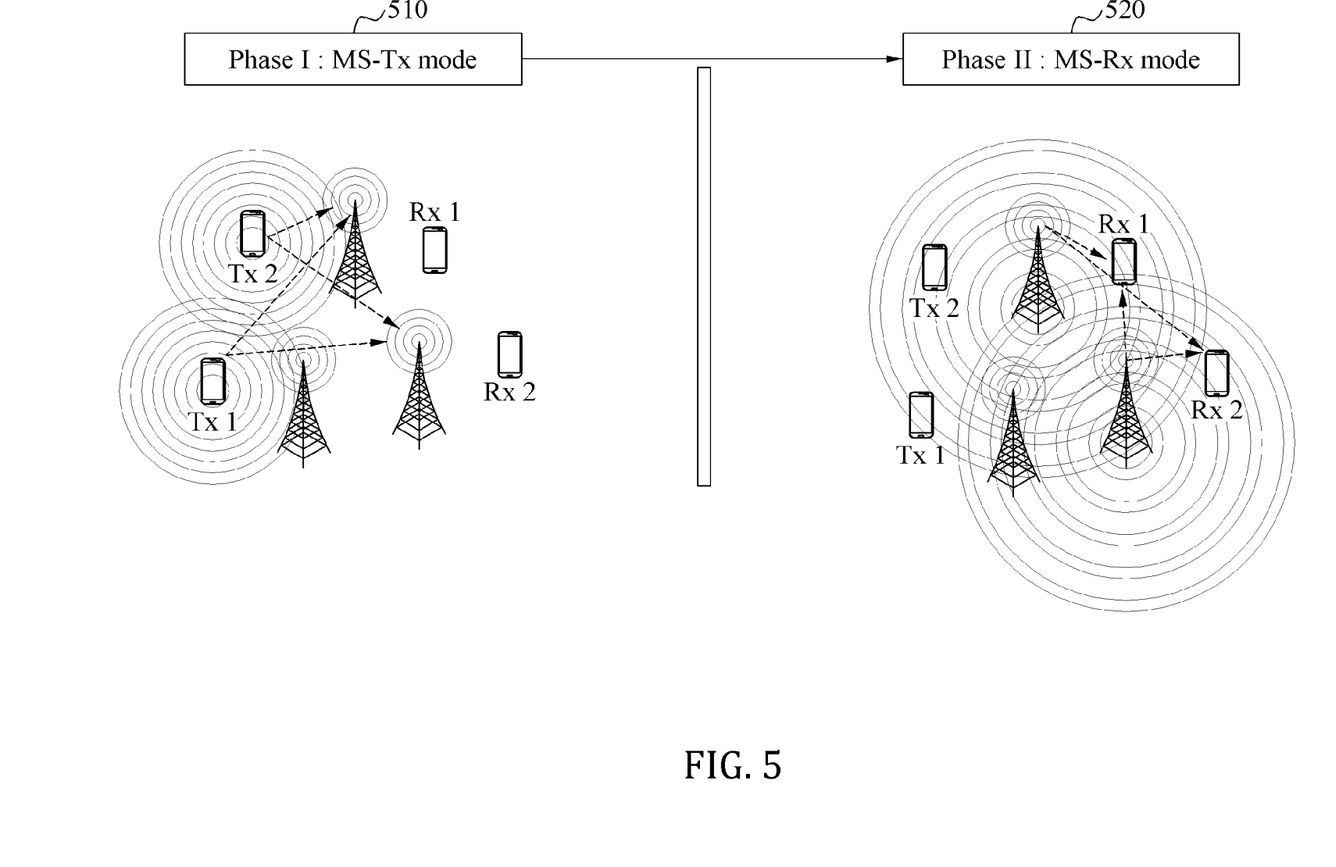
FIG. 5 illustrates phases of relaying data among a plurality of mobile terminals using a plurality of base stations according to an embodiment.

FIG. 5 illustrates phases of relaying data among a plurality of mobile terminals using a plurality of base stations according to an embodiment.

Referring to FIG. 5, each of source terminals (e.g., the first source terminal 111 and the second source terminal 112 of FIG. 1) and destination terminals (e.g., the first destination terminal 131 and the second destination terminal 132 of FIG. 1) is a mobile terminal, and each of relay terminals is a base station.

In such a case, in phase I, block 510, a plurality of mobile source terminals may transmit data to a plurality of base stations. In phase II, block 520, the base stations may relay the data to a plurality of mobile destination terminals.

The descriptions provided with reference to FIGS. 1 through 4 may be applicable to the description of the mobile terminals and the base stations illustrated with reference to FIG. 5, and thus a more detailed description will be omitted here.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A relay method to relay data among a plurality of terminal pairs using a plurality of relay terminals, wherein a pair of a first source terminal among a plurality of source terminals and a first destination terminal among a plurality of destination terminals is formed when the first source terminal is configured to transmit data to the first destination terminal, the relay method comprising:
   generating an effective interference channel matrix based on interference channel matrices between the source terminals and the destination terminals;
   determining a basis matrix comprising a plurality of null space vectors, each of the null space vectors indicating a null space of the effective interference channel matrix;
   generating an effective channel matrix based on channel matrices between the source terminals and the destination terminals paired with the source terminals; and
   generating beamforming matrices for the relay terminals by determining a coefficient vector for linearly combining the plurality of null space vectors based on the effective channel matrix and the basis matrix.

2. The relay method of claim 1, wherein the source terminals are configured to encode data using a predetermined space-time block code (STBC) method, and the destination terminals are configured to decode the data using the STBC method.

3. The relay method of claim 1, wherein the generating of the effective interference channel matrix comprises:
   obtaining a first channel matrix between a plurality of source antennas comprised in the source terminals and a plurality of relay antennas comprised in the relay terminals, and a second channel matrix between the relay antennas and a plurality of destination antennas comprised in the destination terminals; and
   calculating the effective interference channel matrix based on the first channel matrix and the second channel matrix.

4. The relay method of claim 3, wherein the calculating of the effective interference channel matrix comprises:
   obtaining an interference pair of a source terminal and a destination terminal excluded from the terminal pairs;
   transposing a channel matrix between the source terminal belonging to the interference pair and one of the relay terminals; and
   calculating a Kronecker product of the transposed channel matrix and a channel matrix between the destination terminal belonging to the interference pair and the one of the relay terminals.

5. The relay method of claim 1, wherein the effective interference channel matrix comprises effective channels between antennas of the first source terminal and antennas of remaining destination terminals unpaired with the first source terminal.

6. The relay method of claim 1, wherein each of the plurality of null space vectors is not zero vector.

7. The relay method of claim 1, wherein the generating of the effective channel matrix comprises:
   obtaining a first channel matrix between a plurality of source antennas comprised in the source terminals and a plurality of relay antennas comprised in the relay terminals, and a second channel matrix between the relay antennas and a plurality of destination antennas comprised in the destination terminals; and
   calculating the effective channel matrix based on the first channel matrix and the second channel matrix.

8. The relay method of claim 7, wherein the calculating of the effective channel matrix comprises:
   transposing a channel matrix between a source terminal belonging to a terminal pair and any one of the relay terminals; and
   calculating a Kronecker product of the transposed channel matrix and a channel matrix between a destination terminal belonging to the terminal pair and the one of the relay terminals.

9. The relay method of claim 1, wherein generating beamforming matrices comprises:
   calculating a matrix product of the effective channel matrix and the basis matrix;
   calculating an eigenvector corresponding to a maximum eigenvalue of a matrix from the matrix product;
   calculating an inner product of the basis matrix and the eigenvector; and
   forming a matrix using vectors from the inner product.

10. The relay method of claim 1, wherein generating beamforming matrices comprises:
    formulating a query of maximizing a throughput among the terminal pairs based on a transmission method used by the source terminals and the destination terminals; and
    calculating the beamforming matrices by solving the query using the effective channel matrix and the basis matrix.

11. The relay method of claim 1, further comprising storing a program in a non-transitory computer-readable medium, said program, when being executed, relaying said data.

12. The relay method of claim 1, wherein the beamforming matrices are vectorized based on the effective interference channel matrix, and wherein the vectorized beamforming matrices are set as linear combination of the plurality of null space vectors of the base matrix.

13. A relay system configured to relay data between a plurality of source terminals and a plurality of destination terminals using a plurality of relay terminals, wherein the data is generated based on a space-time block code (STBC) method, the relay system comprising:
    an effective interference channel matrix generator configured to generate an effective interference channel matrix based on interference channel matrices between the source terminals and the destination terminals;
    a basis matrix calculator configured to determine a basis matrix comprising a plurality of null space vectors, each of the null space vectors indicating a null space of the effective interference channel matrix;
    an effective channel matrix generator configured to generate an effective channel matrix based on channel matrices between the source terminals and the destination terminals paired with the source terminals; and
    a beamforming matrix generator configured to generate beamforming matrices for the relay terminals by determining a coefficient vector for linearly combining the plurality of null space vectors based on the effective channel matrix and the basis matrix.

14. The relay system of claim 13, further comprising:
    a channel matrix obtainer configured to obtain a first channel matrix between a plurality of source antennas comprised in the source terminals and a plurality of relay antennas comprised in the relay terminals, and a second channel matrix between the relay antennas and a plurality of destination antennas comprised in the destination terminals.

15. The relay system of claim 13, wherein the effective interference channel matrix generator comprises:
    an interference pair obtainer configured to obtain an interference pair of a source terminal and a destination terminal unpaired with the source terminal;
    a transposer configured to transpose a channel matrix between the source terminal belonging to the interference pair and any one of the relay terminals; and
    a Kronecker multiplier configured to calculate a Kronecker product of the transposed channel matrix and a channel matrix between the destination terminal belonging to the interference pair and the any one of the relay terminals.

16. The relay system of claim 13, wherein the effective channel matrix generator comprises:
    a terminal pair obtainer configured to obtain a terminal pair of a source terminal and a destination terminal paired with the source terminal;
    a transposer configured to transpose a channel matrix between the source terminal belonging to the terminal pair and any one of the relay terminals; and
    a Kronecker multiplier configured to calculate a Kronecker product of the transposed channel matrix and a channel matrix between the destination terminal belonging to the terminal pair and the one of the relay terminals.

17. The relay system of claim 13, wherein the beamforming matrix generator comprises:
    a matrix multiplier configured to calculate a matrix product of the effective channel matrix and the basis matrix;
    an eigenvector calculator configured to calculate an eigenvector corresponding to a maximum eigenvalue of a matrix from the matrix product;
    an inner multiplier configured to calculate an inner product of the basis matrix and the eigenvector; and
    a matrix former configured to form a matrix using vectors from the inner product.

18. The relay system of claim 13, wherein the beamforming matrix generator comprises:
    a formulator configured to formulate a query of maximizing a throughput among terminal pairs based on a transmission method used by the source terminals and the destination terminals; and
    a solver configured to solve the query using the effective channel matrix and the basis matrix to calculate the beamforming matrices.

* * * * *